(12) United States Patent
Zong

(10) Patent No.: US 9,958,317 B1
(45) Date of Patent: May 1, 2018

(54) DIFFERENTIAL GONIOPHOTOMETER

(71) Applicant: THE UNITED STATES OF AMERICA, AS REPRESENTED BY THE SECRETARY OF COMMERCE, Washington, DC (US)

(72) Inventor: Yuqin Zong, Gaithersburg, MD (US)

(73) Assignee: THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 0 days. days.

(21) Appl. No.: 15/423,216

(22) Filed: Feb. 2, 2017

(51) Int. Cl.
G01J 1/04 (2006.01)
G01J 1/02 (2006.01)
G01J 1/42 (2006.01)

(52) U.S. Cl.
CPC .......... *G01J 1/0266* (2013.01); *G01J 1/0295* (2013.01); *G01J 1/0411* (2013.01); *G01J 1/42* (2013.01); *G01J 2001/4247* (2013.01)

(58) Field of Classification Search
CPC ...... G01J 1/0266; G01J 1/0295; G01J 1/0411; G01J 1/42; G01J 2001/4247
See application file for complete search history.

(56) References Cited

U.S. PATENT DOCUMENTS 6,597,457 B1 * 7/2003 Silverglate ................ G01J 1/04
356/236

FOREIGN PATENT DOCUMENTS

WO 2013093154 A1 6/2013

OTHER PUBLICATIONS

Integrating sphere source for homogenity and white balance fisheye cameras, Gigahertz-Optik, 2017, 1-5.
Kokka et al., Fisheye camera method for determining spatial non-uniformity corrections in luminous flux measurements with integrating spheres, Aalto University, Oct. 31, 2016, 52-59.
Rabaza et al., A new method of measuring ans monitoring light pollution in the night sky, Lighting Res. Technol, Sep. 9, 2013, 5-19, vol. 46.
Sigernes et al., Auroral all-sky camera calibration, Geoscientific Instrumentation Methods and Data Systems, 2014, 241-245.

* cited by examiner

*Primary Examiner* — Michael P Stafira
(74) *Attorney, Agent, or Firm* — Toby D. Hain

(57) ABSTRACT

A differential goniophotometer includes: an integrating sphere including an interior bounded by an interior wall and that receives, in the interior, a primary light source that provides primary light; and a fisheye lens disposed in the interior of the integrating sphere in optical communication with the primary light source such that the fisheye lens: receives the primary light from the primary light source, and provides a curvilinear image of the interior of the integrating sphere and the primary light.

18 Claims, 22 Drawing Sheets

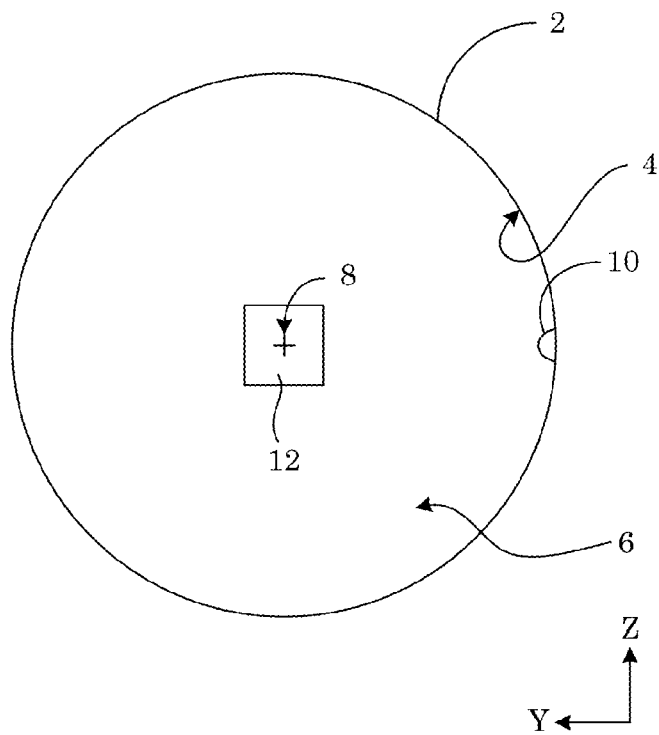
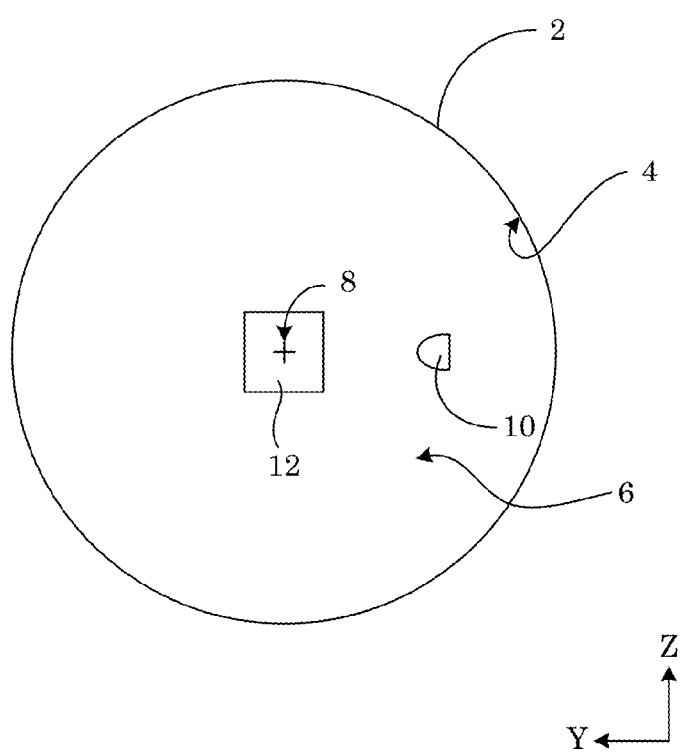
Figure 4

(A) 100
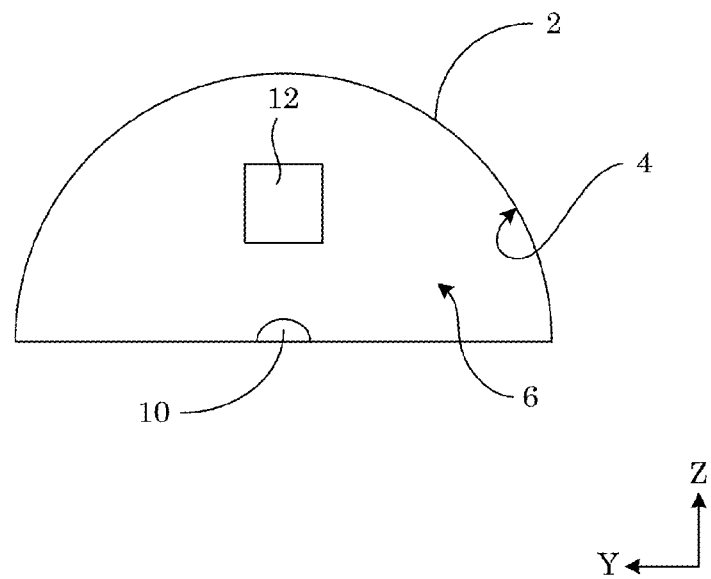
(B) 100
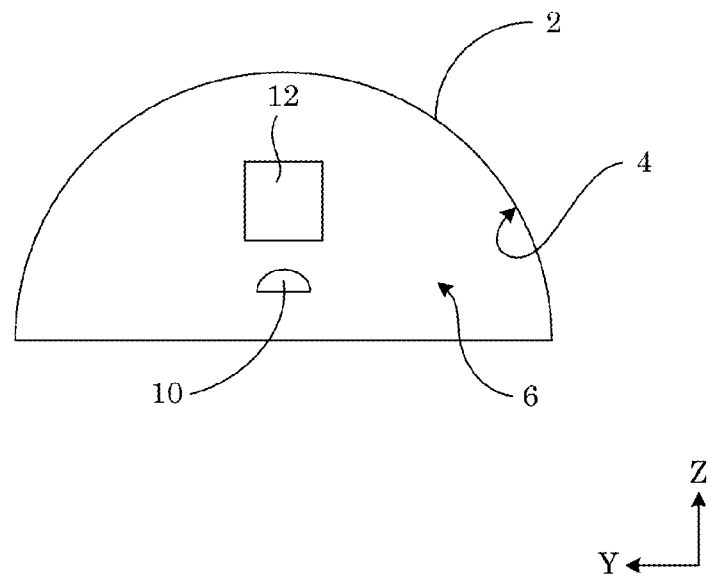
Figure 12

$$\begin{bmatrix} 1 & h_{1,2} & h_{1,3} & h_{1,4} & h_{1,5} & h_{1,6} & h_{1,7} & h_{1,8} & h_{1,9} & \cdots & h_{1,1022} & h_{1,1023} & h_{1,1024} \\ h_{2,1} & 1 & & & & & & & & \cdots & & & h_{2,1024} \\ h_{3,1} & & 1 & & & & & & & \cdots & & & h_{3,1024} \\ h_{4,1} & & & 1 & & & & & & \cdots & & & h_{4,1024} \\ h_{5,1} & & & & 1 & & & & & \cdots & & & h_{5,1024} \\ h_{6,1} & & & & & 1 & & & & \cdots & & & h_{6,1024} \\ h_{7,1} & & & & & & 1 & & & \cdots & & & h_{7,1024} \\ h_{8,1} & & & & & & & 1 & & \cdots & & & h_{8,1024} \\ h_{9,1} & & & & & & & & 1 & \cdots & & & h_{9,1024} \\ \vdots & \vdots & \vdots & \vdots & \vdots & \vdots & \vdots & \vdots & \vdots & \ddots & \vdots & \vdots & \vdots \\ h_{1012,1} & & & & & & & & & \cdots & 1 & & h_{1022,1024} \\ h_{1023,1} & & & & & & & & & \cdots & & 1 & h_{1023,1024} \\ h_{1024,1} & & & & & & & & & \cdots & & & 1 \end{bmatrix}$$

DIFFERENTIAL GONIOPHOTOMETER

STATEMENT REGARDING FEDERALLY SPONSORED RESEARCH

This invention was made with United States Government support from the National Institute of Standards and Technology. The Government has certain rights in the invention.

CROSS REFERENCE TO RELATED APPLICATIONS

This application claims the benefit of U.S. Provisional Patent Application Ser. Nos. 62/185,018, filed Jun. 2, 2016, and 62/344,659, filed on Jun. 26, 2016, the disclosure of each of which is incorporated herein by reference in its entirety.

BRIEF DESCRIPTION

Disclosed is a differential goniophotometer comprising: an integrating member comprising an interior bounded by an interior wall and that receives, in the interior, a primary light source that provides primary light; and a fisheye lens disposed in the interior of the integrating sphere in optical communication with the primary light source such that the fisheye lens: receives the primary light from the primary light source, and provides a curvilinear image of the interior of the integrating sphere and the primary light.

Also disclosed is a differential goniophotometer comprising: an integrating member comprising an interior bounded by an interior wall; a primary light source disposed in the interior of the integrating sphere and that provides primary light to the interior; a fisheye lens disposed in the interior of the integrating sphere in optical communication with the primary light source such that the fisheye lens: receives the primary light from the primary light source, and provides a curvilinear image of the interior of the integrating sphere and the primary light; an auxiliary light source disposed in the interior of the integrating sphere such that the auxiliary light produces auxiliary light and comprises: a luminous surface to communicate the auxiliary light; and a light baffle interposed between the luminous surface and the fisheye lens; a photometer comprising: a photodetector disposed on integrating sphere; and a light baffle disposed in a view of the photodetector.

BRIEF DESCRIPTION OF THE DRAWINGS

The following descriptions should not be considered limiting in any way. With reference to the accompanying drawings, like elements are numbered alike.

FIG. 4 shows a plurality of differential goniophotometers;
FIG. 12 shows a plurality of differential goniophotometers;
FIG. 20 shows a PSF matrix.

DETAILED DESCRIPTION

A detailed description of one or more embodiments is presented herein by way of exemplification and not limitation.

It has been discovered that a differential goniophotometer herein provides a fast measurement of an angular intensity distribution of a primary light source. Instead of using a conventional goniophotometer, the differential goniophotometer includes an integrating such as integrating sphere or an integrating hemisphere in combination with a fisheye lens for measurement of primary light produced by the primary light source and can determine total luminous flux, total radiant flux, and the like. A camera can be disposed on the fisheye lens in which the fisheye lens has a large field of view to measure relative luminance or radiance distribution of the primary light source over an entire interior wall of the integrating sphere. Curvilinear images acquired by the fisheye lens are used to produce a luminous or radiant intensity distribution of the primary light source, based on a characterization of the integrating sphere for a point spread function and spatial non-uniformity. The absolute angular intensity distribution of the primary light source is obtained with calibration of the primary light source for total luminous flux or total radiant flux. The measured angular intensity distribution of the primary light source provides a correction of measurement error in total luminous flux, total radiant flux, total spectral radiant flux, and the like, which can result from a spatial non-uniformity of an integrating sphere.

Figure 1:
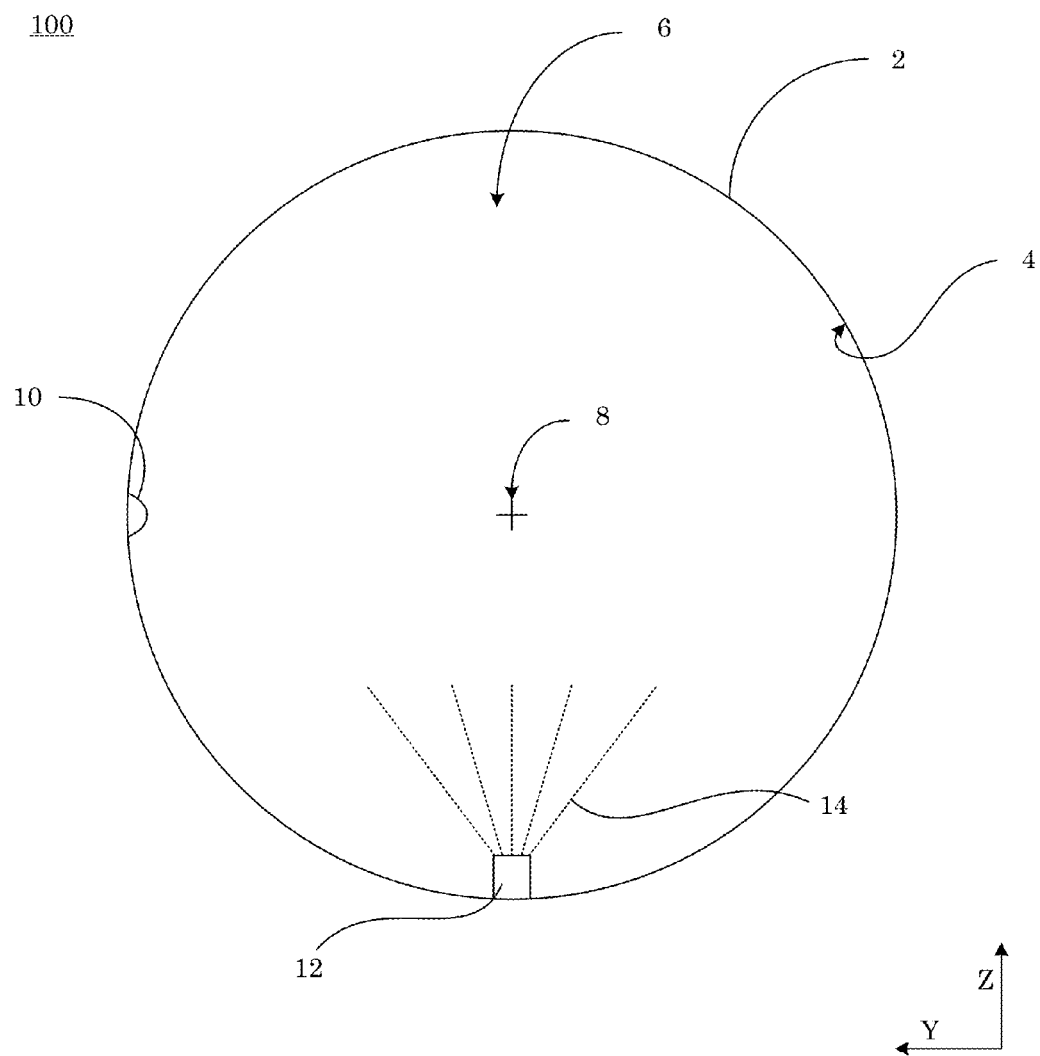
FIG. 1 shows a differential goniophotometer.
Figure 2:
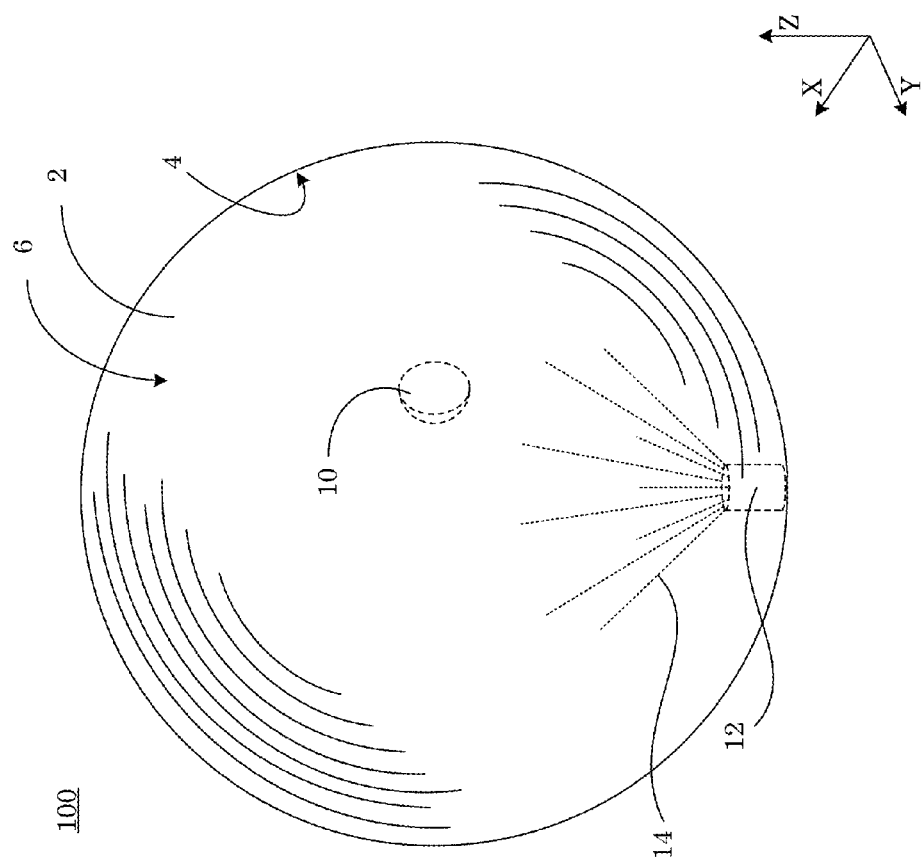
FIG. 2 shows a perspective view of the differential goniophotometer shown in FIG. 1.
Figure 3:
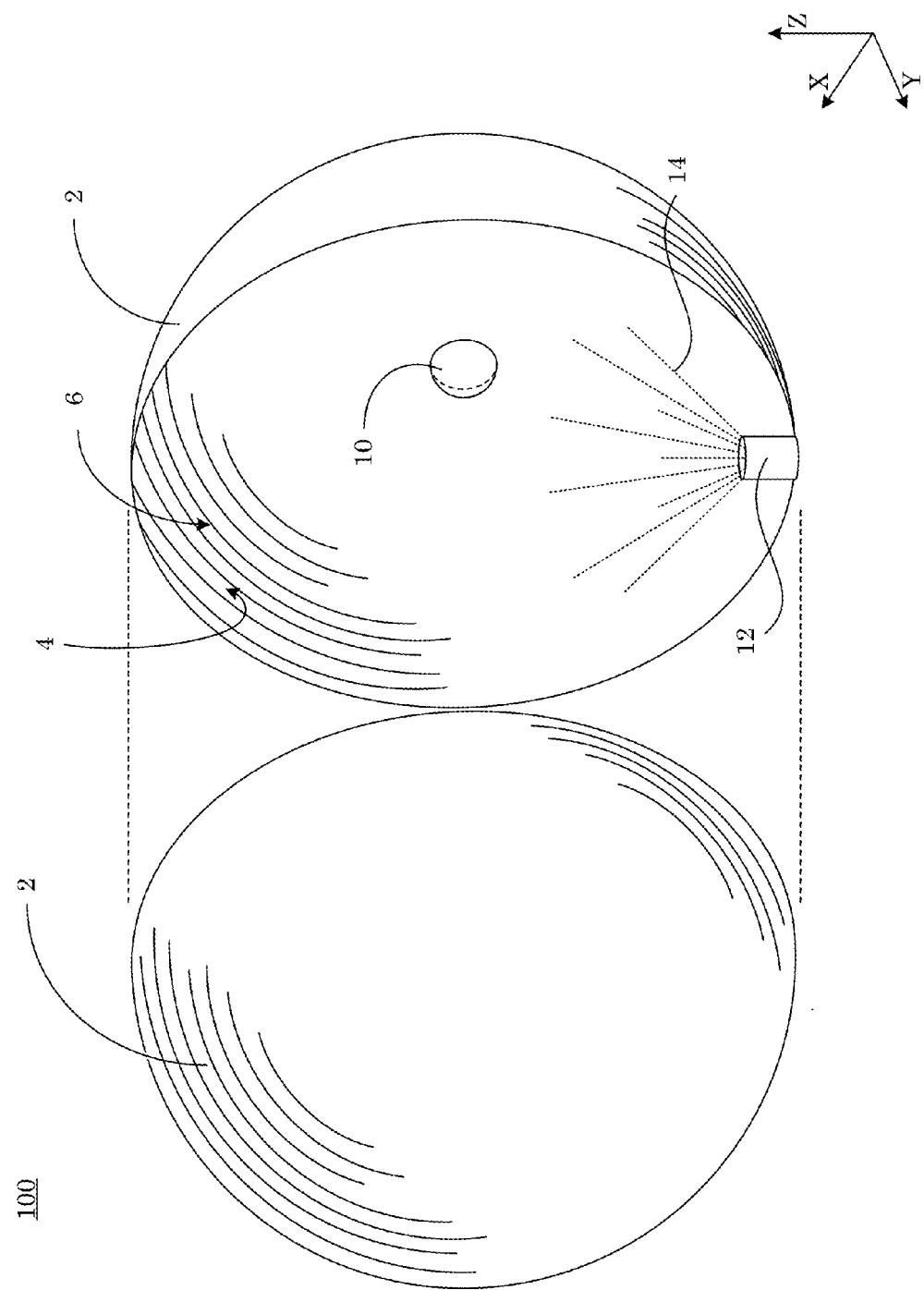
FIG. 3 shows an exploded view of the differential goniophotometer shown in FIG. 1.

In an embodiment, with reference to FIG. 1, FIG. 2 (perspective view), and FIG. 3 (exploded view), differential goniophotometer 100 includes integrating sphere 2 as an integrating member and including interior 6 bounded by interior wall 4 and that receives, in interior 6, primary light source 12 that provides primary light 14; and fisheye lens 10 disposed in interior 6 of integrating sphere 2. Fisheye lens 10 is in optical communication with primary light source 12 such that fisheye lens 10 receives primary light 14 from primary light source 12 and provides a curvilinear image of interior 6 of integrating sphere 2 and primary light 12. According to an embodiment, differential goniophotometer 100 includes primary light source 12 disposed in interior 6 of integrating sphere 2.

Primary light source and fisheye lens 10 can be disposed in differential goniophotometer 100 in a plurality of relative positions.

In an embodiment, with reference to panel A of FIG. 4, primary light source 12 is disposed in center 8 (indicated by a crosshair for purpose of illustration) of integrating sphere 2, fisheye lens 10 is disposed on interior wall 4 of integrating sphere 2. In an embodiment, with reference to panel B of FIG. 4, primary light source 12 is disposed in center 8 of integrating sphere 2, and fisheye lens 10 is interposed between center 8 of integrating sphere 2 and interior wall 4.

Figure 5:
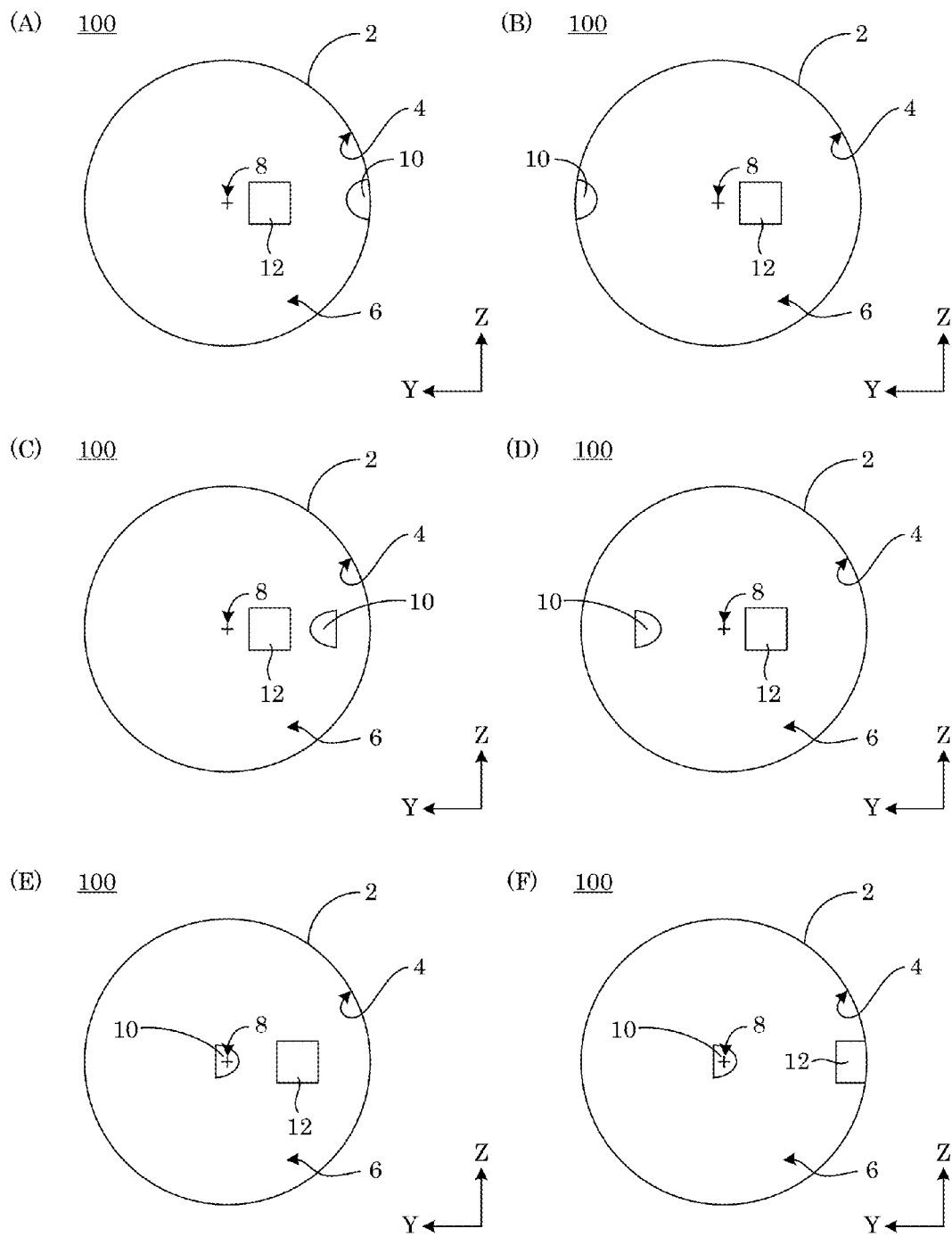
FIG. 5 shows a plurality of differential goniophotometers.

In an embodiment, with reference to panel A of FIG. 5, primary light source 12 is interposed between center 8 and interior wall 4 of integrating sphere 2, and fisheye lens 10 is disposed on interior wall 4 of integrating sphere 2, wherein primary light source 12 and fisheye lens 10 are disposed in a same hemisphere of integrating sphere 2. In an embodiment, with reference to panel B of FIG. 5, primary light source 12 is interposed between center 8 and interior wall 4 of integrating sphere 2, and fisheye lens 10 is disposed on interior wall 4 of integrating sphere 2, wherein primary light source 12 and fisheye lens 10 are disposed in a different hemisphere of integrating sphere 2.

In an embodiment, with reference to panel C of FIG. 5, primary light source 12 is interposed between center 8 and interior wall 4 of integrating sphere 2, and fisheye lens 10 is interposed between center 8 and interior wall 4 of integrating sphere 2, wherein primary light source 12 and fisheye lens 10 are disposed in a same hemisphere of integrating sphere 2. In an embodiment, with reference to panel D of FIG. 5, primary light source 12 is interposed between center 8 and interior wall 4 of integrating sphere 2, and fisheye lens 10 is interposed between center 8 and interior wall 4 of integrating sphere 2, wherein primary light source 12 and fisheye lens 10 are disposed in a different hemisphere of integrating sphere 2.

In an embodiment, with reference to panel E of FIG. 5, primary light source 12 is interposed between center 8 and interior wall 4 of integrating sphere 2, and fisheye lens 10 is disposed at center 8 of integrating sphere 2. In an embodiment, with reference to panel F of FIG. 5, primary light source 12 is disposed on interior wall 4 of integrating sphere 2, and fisheye lens 10 is disposed at center 8 of integrating sphere 2.

Figure 6:
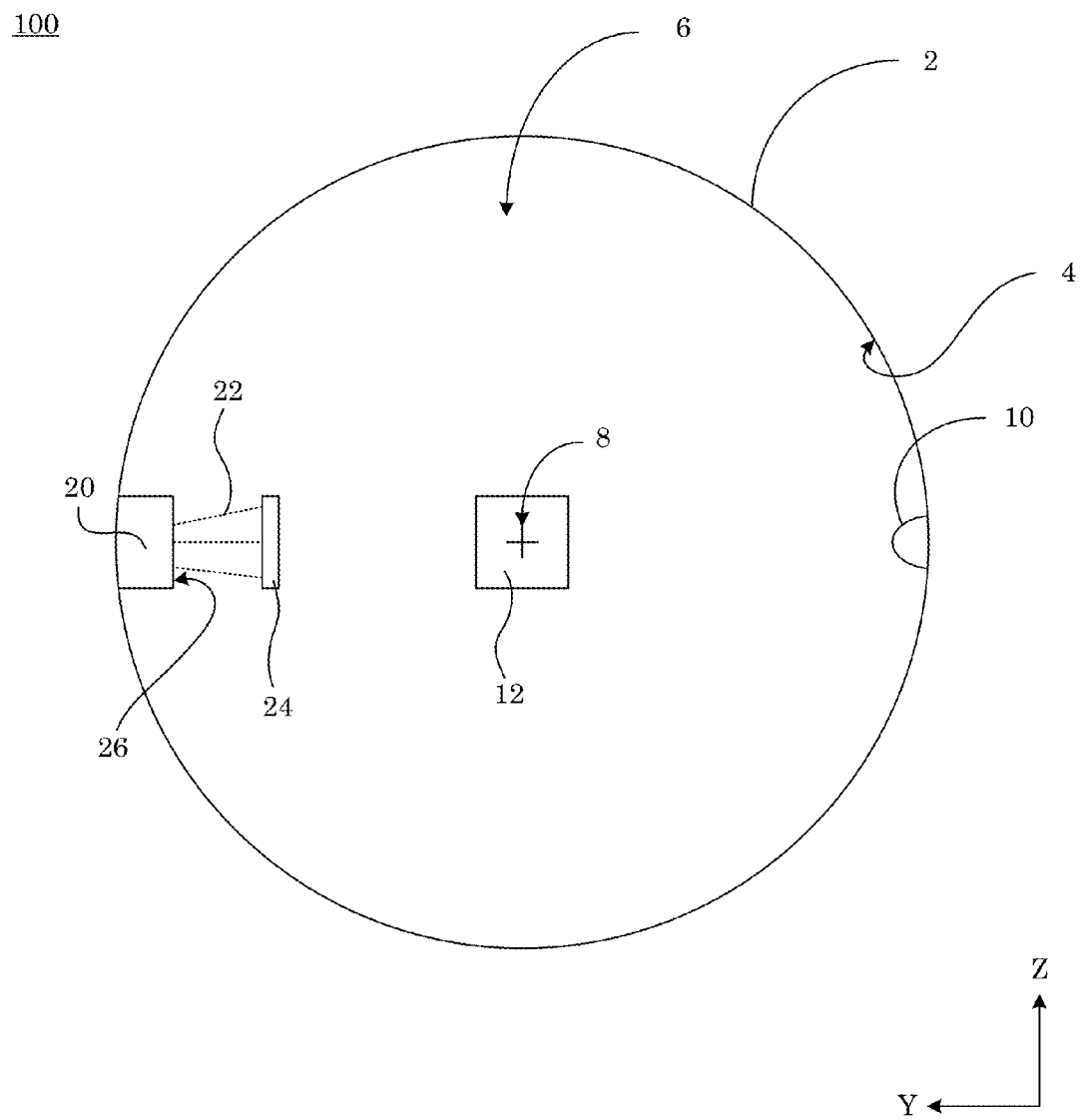
FIG. 6 shows a differential goniophotometer.

According to an embodiment, with reference to FIG. 6, differential goniophotometer 100 includes auxiliary light source 20 disposed in interior 6 of integrating sphere 2 such that auxiliary light source 20 produces auxiliary light 22 and includes: luminous surface 26 that communicates auxiliary light 22 from auxiliary light source 20; and light baffle 24. Light baffle 24 can be interposed between luminous surface 26 and e.g., fisheye lens 10, center 8 of integrating sphere 2, photometer 28 (see FIG. 8), or the like. Here, light baffle 24 intercepts all or a portion of auxiliary light 22 produced by auxiliary light source 20. Moreover, light baffle 24 can diffuse auxiliary light 22, reflect auxiliary light 22, or absorb auxiliary light 22 incident on light baffle 24. In an embodiment, light baffle 24 diffuses auxiliary light 22. The relate position of auxiliary light source 20, fisheye lens 10, and primary light source 20 is arbitrary. It is contemplated that primary light 14 produced by primary light source 12 is within the field of view of fisheye lens 10. Moreover, the field of view of fisheye lens 10 covers the entire interior 6 of the integrating sphere 2. As used herein, "primary light source" refers to a light source in which a light baffle is not interposed between the light source and fisheye lens 10. As used herein, "auxiliary light source" refers to a light source in which a light baffle is interposed between the light source and fisheye lens 10. Auxiliary light source 20 can be used to determine the amount of light that is absorbed by a primary light source itself or by any components inside the integrating sphere of the differential goniophotometer 100.

Figure 7:
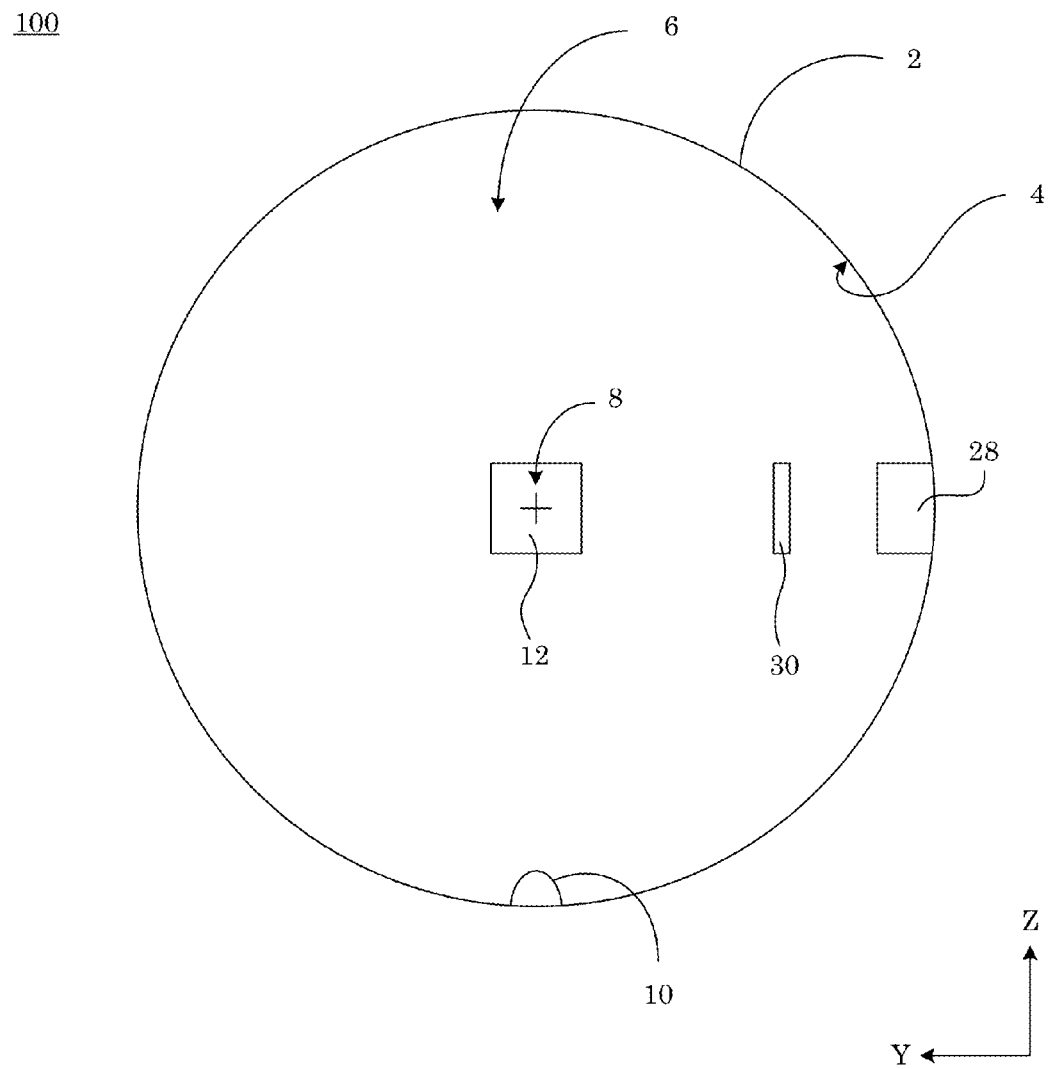
FIG. 7 shows a differential goniophotometer.

In an embodiment, with reference to FIG. 7, differential goniophotometer 100 includes photometer 31 including: photodetector 28 disposed on integrating sphere 2; and optionally light baffle 30 disposed in a field of view of photodetector 28. Here, light baffle 30 shields photodetector 28 from viewing light directly.

Figure 8:
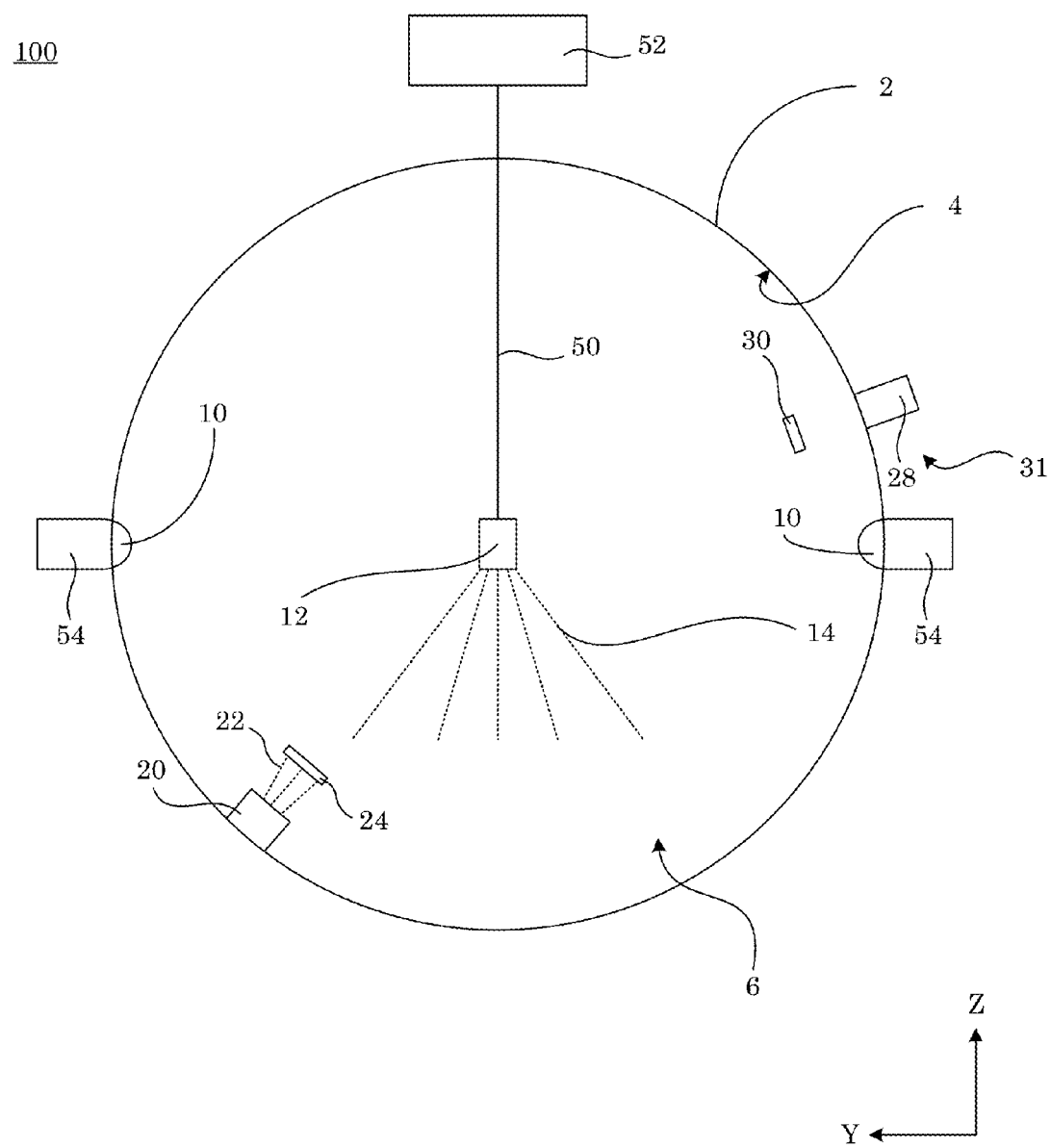
FIG. 8 shows a differential goniophotometer.

According to an embodiment, as shown in FIG. 8, differential goniophotometer 100 includes integrating sphere 2 including interior 6 bounded by interior wall 4; primary light source 12 disposed in interior 6 of integrating sphere 2 and that provides primary light 14 to interior 6; fisheye lens 10 disposed in interior 6 of integrating sphere 2 in optical communication with primary light source 12 such that the fisheye lens: receives primary light 14 from primary light source 12, and provides a curvilinear image of interior 6 of integrating sphere 2 and primary light 14; auxiliary light source 20 disposed in interior 6 of integrating sphere 2 such that auxiliary light source 20 produces auxiliary light 22 and includes: luminous surface 26 to communicate auxiliary light 22; and light baffle 24 interposed between luminous surface 26 and fisheye lens 10; photometer 31 including: photodetector 28 disposed on integrating sphere 2; and light baffle 30 disposed in a view of photodetector 28. Camera 54 can be in optical communication with fisheye lens 10 to receive the curvilinear image of interior 6 of integrating sphere 2 and primary light 14 from fisheye lens 10. Additionally, light controller 52 can be in electrical communication with primary light source 12 to control production and output of primary light 14. Primary light source 12 can be suspended from interior wall 4 of integrating sphere 2 by post 50.

Figure 9:
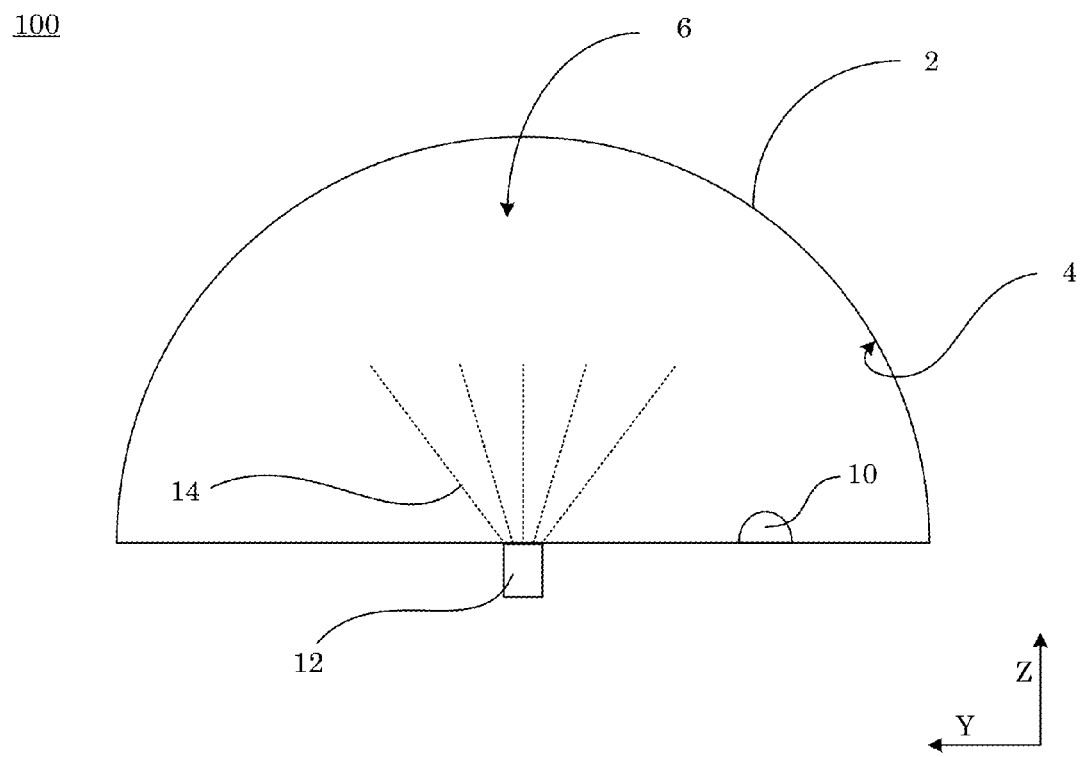
FIG. 9 shows a differential goniophotometer.
Figure 10:
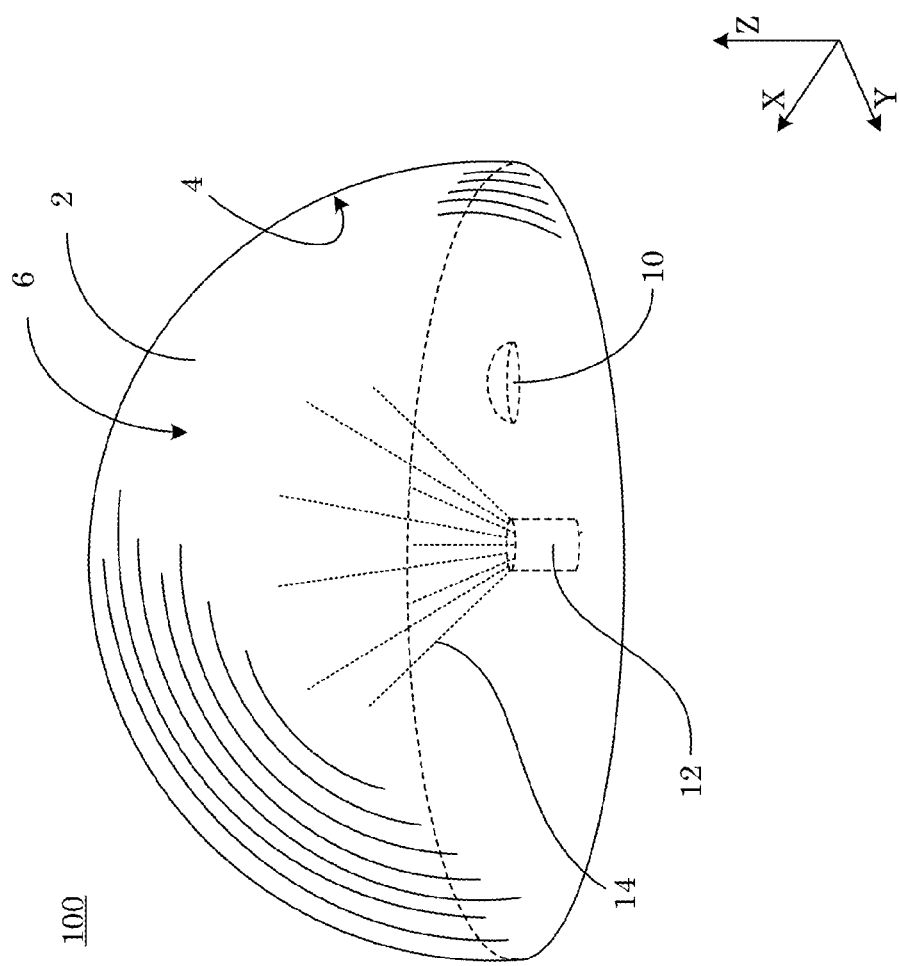
FIG. 10 shows a perspective view of the differential goniophotometer shown in FIG. 1.
Figure 11:
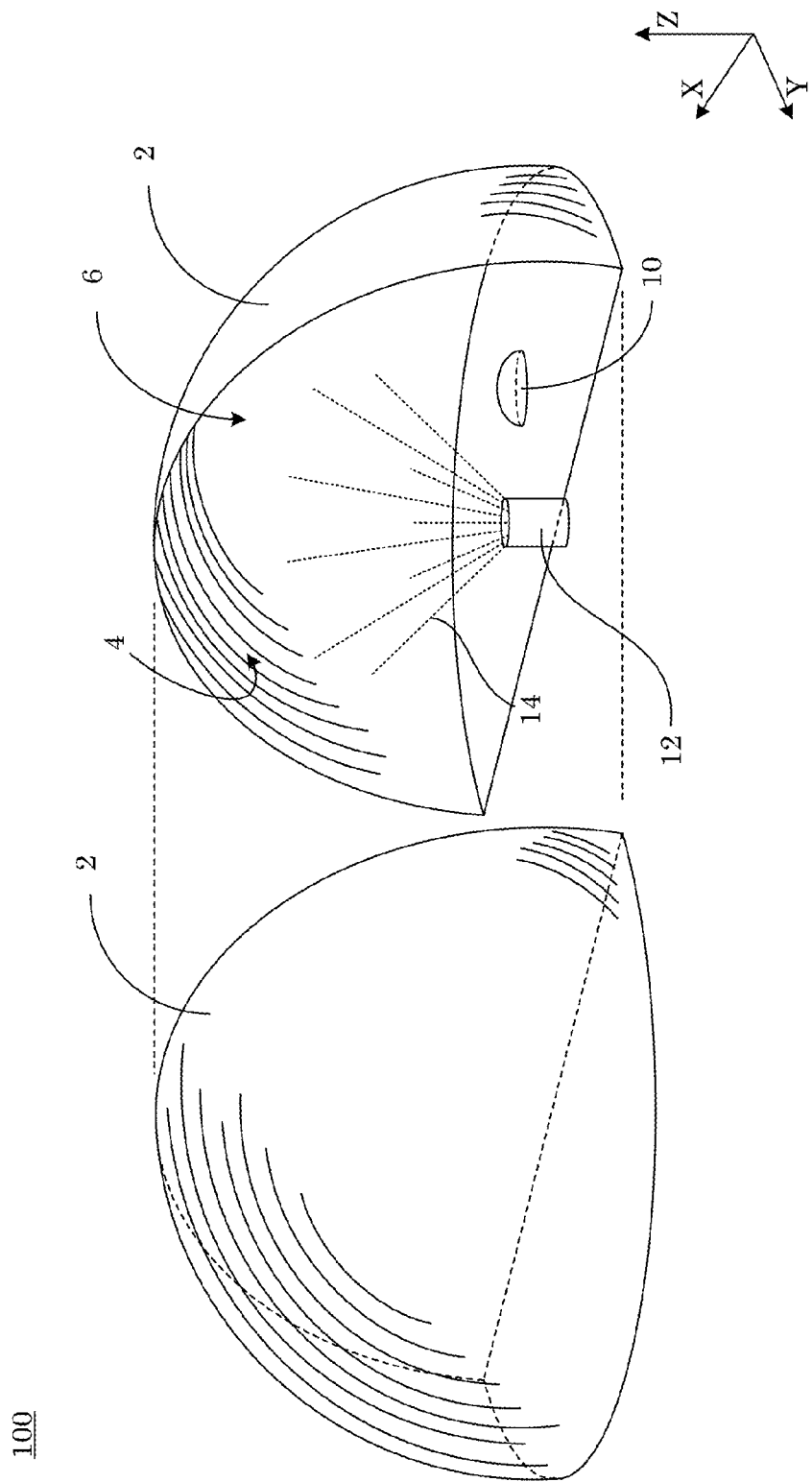
FIG. 11 shows an exploded view of the differential goniophotometer shown in FIG. 1.

In an embodiment, with reference to FIG. 9, FIG. 10 (perspective view), and FIG. 11 (exploded view), differential goniophotometer 100 includes integrating hemisphere 2 as the integrating member and including interior 6 bounded by interior wall 4 and that receives, in interior 6, primary light source 12 that provides primary light 14; and fisheye lens 10 disposed in interior 6 of integrating hemisphere 2. Fisheye lens 10 is in optical communication with primary light source 12 such that fisheye lens 10 receives primary light 14 from primary light source 12 and provides a curvilinear image of interior 6 of integrating hemisphere 2 and primary light 12. According to an embodiment, differential goniophotometer 100 includes primary light source 12 disposed in interior 6 of integrating hemisphere 2.

Primary light source and fisheye lens 10 can be disposed in differential goniophotometer 100 in a plurality of relative positions.

In an embodiment, with reference to panel A of FIG. 12, primary light source 12 is disposed in the center of integrating hemisphere 2, fisheye lens 10 is disposed on interior wall 4 of integrating hemisphere 2. In an embodiment, with reference to panel B of FIG. 12, primary light source 12 is disposed in the center of integrating hemisphere 2, and fisheye lens 10 is interposed between the center of integrating hemisphere 2 and interior wall 4.

Figure 13:
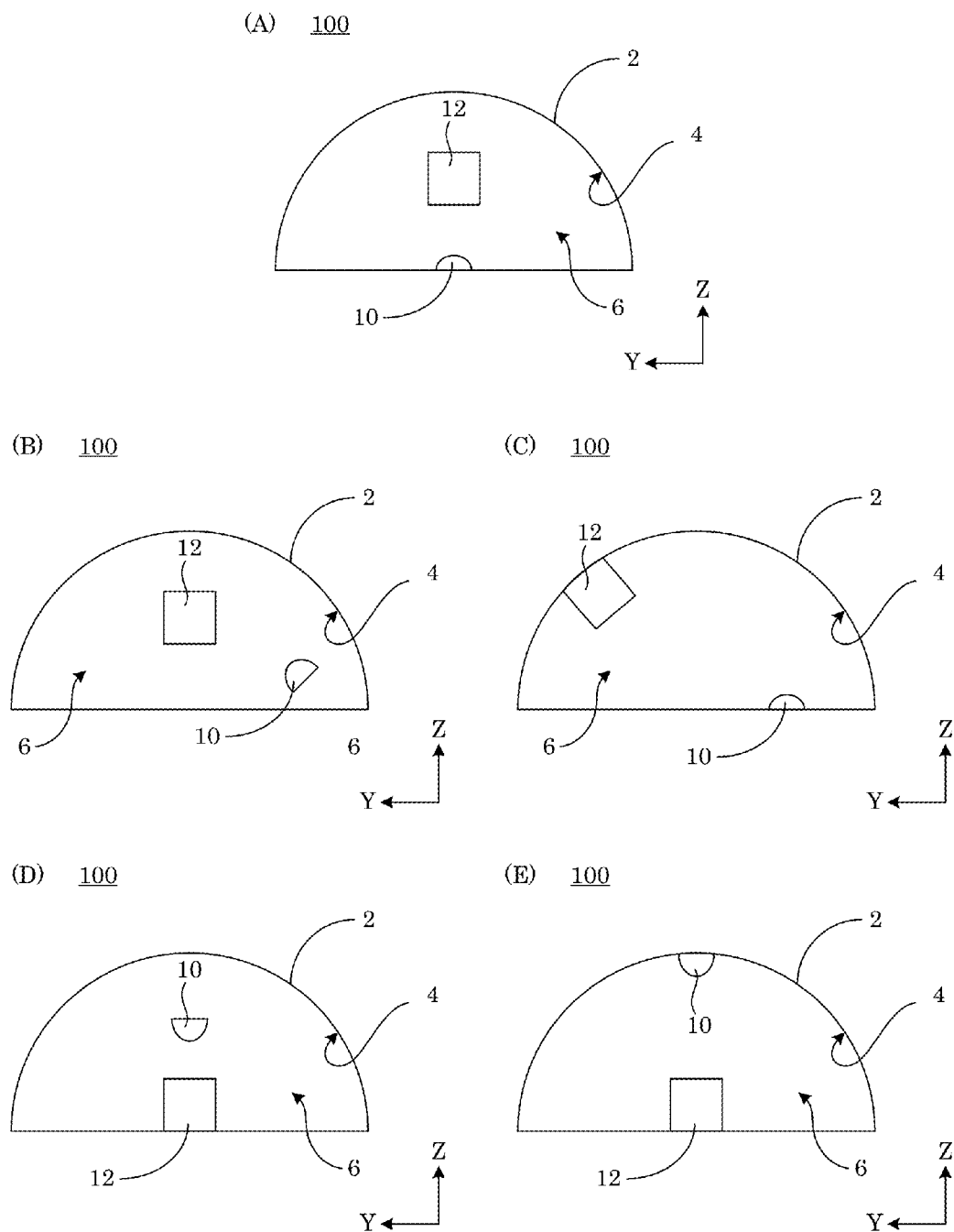
FIG. 13 shows a plurality of differential goniophotometers.

In an embodiment, with reference to panel A of FIG. 13, primary light source 12 is interposed between the center and interior wall 4 of integrating hemisphere 2, and fisheye lens 10 is disposed on interior wall 4 of integrating hemisphere 2. In an embodiment, with reference to panel B of FIG. 13, primary light source 12 is interposed in the center of integrating hemisphere 2, and fisheye lens 10 is interposed between interior wall 4 and the center of integrating hemisphere 2.

In an embodiment, with reference to panel C of FIG. 13, primary light source 12 and fisheye lens 10 are disposed on interior wall 4 of integrating hemisphere 2. In an embodiment, with reference to panel D of FIG. 13, fisheye lens 10 is interposed between center 8 and interior wall 4 of integrating hemisphere 2, and primary light source 12 is disposed on interior wall 4 of integrating hemisphere 2.

In an embodiment, with reference to panel E of FIG. 13, primary light source 12 and fisheye lens 10 are disposed on interior wall 4 of integrating hemisphere 2.

Figure 14:
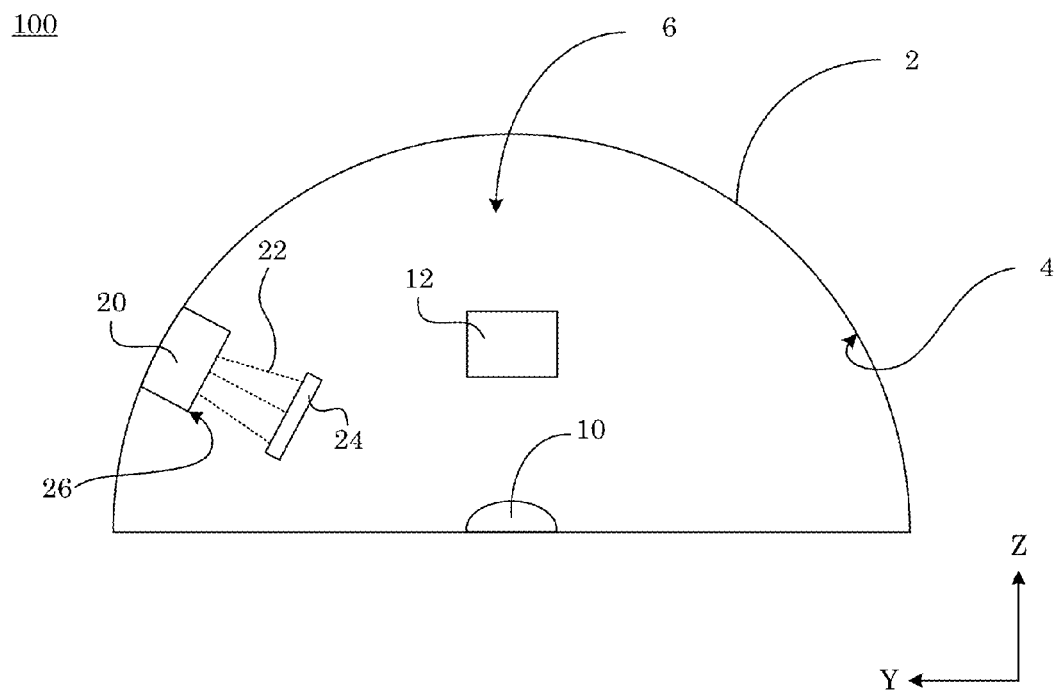
FIG. 14 shows a differential goniophotometer.

According to an embodiment, with reference to FIG. 14, differential goniophotometer 100 includes auxiliary light source 20 disposed in interior 6 of integrating hemisphere 2 such that auxiliary light source 20 produces auxiliary light 22 and includes: luminous surface 26 that communicates auxiliary light 22 from auxiliary light source 20; and light baffle 24. Light baffle 24 can be interposed between luminous surface 26 and e.g., fisheye lens 10, the center of integrating hemisphere 2, photometer 28 (see FIG. 16), or the like. Here, light baffle 24 intercepts all or a portion of auxiliary light 22 produced by auxiliary light source 20. Moreover, light baffle 24 can diffuse auxiliary light 22, reflect auxiliary light 22, or absorb auxiliary light 22 incident on light baffle 24. In an embodiment, light baffle 24 diffuses auxiliary light 22. The relate position of auxiliary light source 20, fisheye lens 10, and primary light source 20 is arbitrary. It is contemplated that primary light 14 produced by primary light source 12 is within the field of view of fisheye lens 10. Moreover, the field of view of fisheye lens 10 covers the entire interior 6 of the integrating hemisphere 2. Auxiliary light source 20 can be used to determine the amount of light that is absorbed by a primary light source itself or by any components inside the integrating hemisphere of the differential goniophotometer 100.

Figure 15:
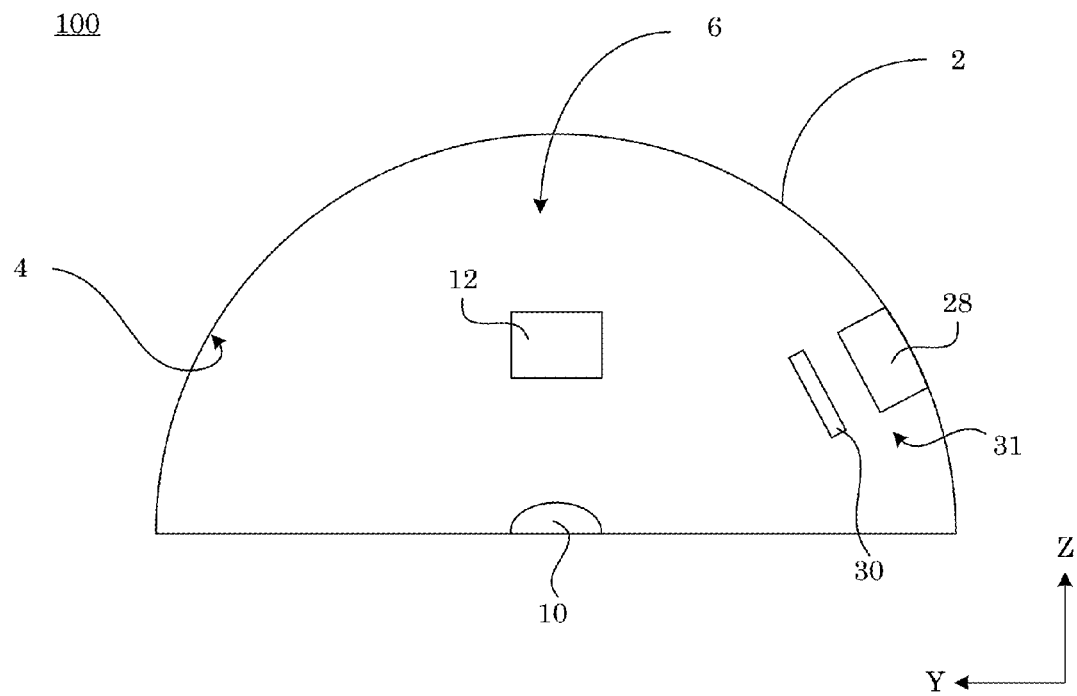
FIG. 15 shows a differential goniophotometer.

In an embodiment, with reference to FIG. 15, differential goniophotometer 100 includes photometer 31 including: photodetector 28 disposed on integrating hemisphere 2; and optionally light baffle 30 disposed in a field of view of photodetector 28. Here, light baffle 30 shields photodetector 28 from viewing light directly.

Figure 16:
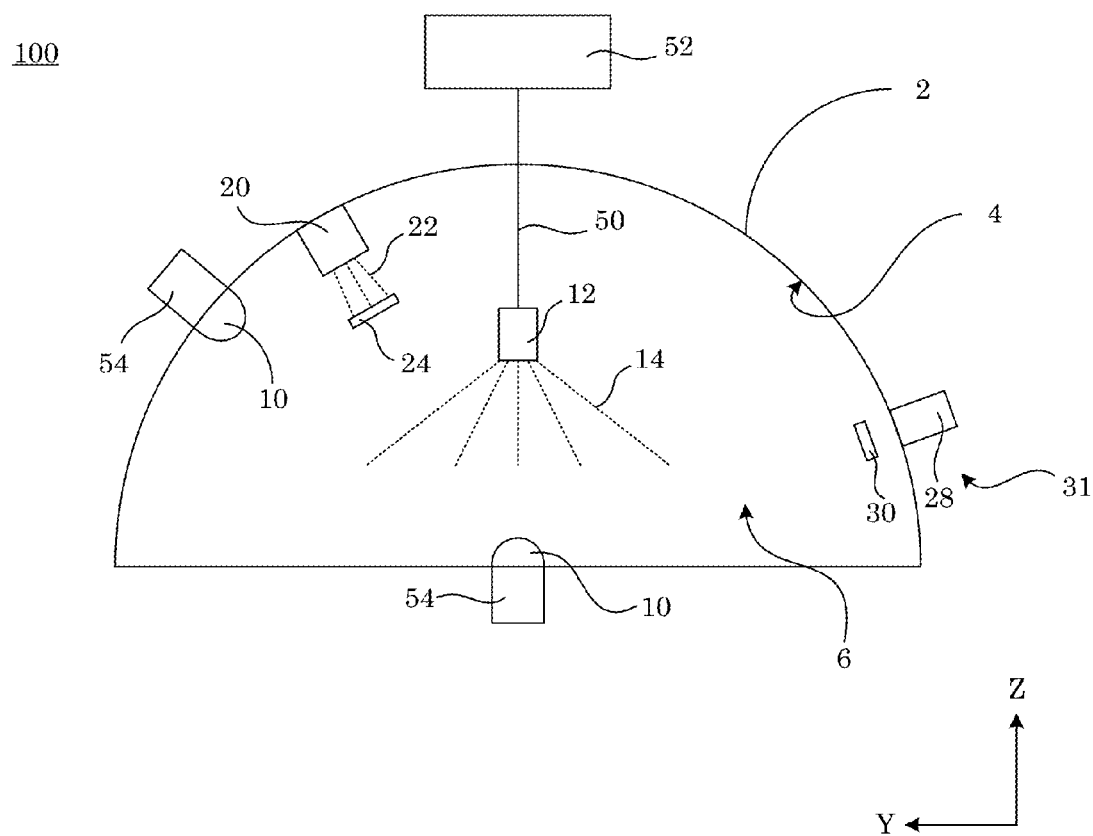
FIG. 16 shows a differential goniophotometer.

According to an embodiment, as shown in FIG. 16, differential goniophotometer 100 includes integrating hemisphere 2 including interior 6 bounded by interior wall 4; primary light source 12 disposed in interior 6 of integrating hemisphere 2 and that provides primary light 14 to interior 6; fisheye lens 10 disposed in interior 6 of integrating hemisphere 2 in optical communication with primary light source 12 such that the fisheye lens: receives primary light 14 from primary light source 12, and provides a curvilinear image of interior 6 of integrating hemisphere 2 and primary light 14; auxiliary light source 20 disposed in interior 6 of integrating hemisphere 2 such that auxiliary light source 20 produces auxiliary light 22 and includes: luminous surface 26 to communicate auxiliary light 22; and light baffle 24 interposed between luminous surface 26 and fisheye lens 10; photometer 31 including: photodetector 28 disposed on integrating hemisphere 2; and light baffle 30 disposed in a view of photodetector 28. Camera 54 can be in optical communication with fisheye lens 10 to receive the curvilinear image of interior 6 of integrating hemisphere 2 and primary light 14 from fisheye lens 10. Additionally, light controller 52 can be in electrical communication with primary light source 12 to control production and output of primary light 14. Primary light source 12 can be suspended from interior wall 4 of integrating hemisphere 2 by post 50.

Differential goniophotometer 100 includes fisheye lens 10 to view interior 6 of integrating sphere 2 and primary light 14 from primary light source 12. Fisheye lens 10 is a wide-angle lens with a field of view from 90° to 360°, specifically from 180° to 360°, and specifically from 90° to 180°. The field of view of fisheye lens 10 subtends from $2\pi$ to $4\pi$ steradians of interior 6.

Fisheye lens 10 can optically communicate a wavelength that includes ultraviolet light, visible light, infrared light, and the like. Such light can include a wavelength from 200 nm to 25000 nm, specifically from 400 nm to 1000 nm. Fisheye lens 10 can be made of a polymer, glass, and the like. In an embodiment, fisheye lens 10 includes a negative group of large concave elements at front, an aperture stop in the middle, and a strong positive group of small convex elements at rear so that the back focal distance of the fisheye lens is longer than its effective focal length. Exemplary fisheye lenses include circular fisheye, full-frame fisheye, and the like. The mapping function of fisheye lens 10 includes an equidistant mapping function, an equisolid angle mapping function, an orthographic mapping function, a stereographic mapping function, and the like. It is contemplated that fisheye lens 10 provides a barrel distortion to images that would otherwise be a rectilinear image if fisheye lens 10 were substituted by a convention camera lens. A size (e.g., a largest linear dimension such as a diameter) of fisheye lens 10 can be from 1 millimeter (mm) to 100 centimeter (cm), specifically from 1 mm to 10 cm, and more specifically from 1 mm to 2 cm. A camera can be disposed in optical communication with fisheye lens 10 to acquire photons transmitted through fisheye lens 10 from primary light source 12. Exemplary cameras include a luminance meter, radiance meter, hyperspectral imager and the like.

The integrating member of differential goniophotometer can be an integrating sphere or an integrating hemisphere. In some embodiment, differential goniophotometer 100 includes integrating sphere 2 to receive fisheye lens 10 and primary light source 12. Interior wall 4 is reflective, e.g., from 20 to 99 diffuse reflection at a wavelength from 200 nm to 25000 nm. A plurality of ports is disposed on integrating sphere 24 mounting components of differential goniophotometer 100, e.g., fisheye lens 10, camera 54, photodetector 28, primary light source 12, auxiliary light source 20, and the like. A size (e.g., a largest linear dimension such as an inner diameter) of integrating sphere 2 can be from 1 centimeter (cm) to 200 meters (m), specifically from 1 cm to 10 m, and more specifically from 1 cm to 2 m.

The integrating member of differential goniophotometer can be an integrating sphere or an integrating hemisphere. In some embodiment, differential goniophotometer 100 includes integrating hemisphere 2 to receive fisheye lens 10 and primary light source 12. Interior wall 4 is reflective, e.g., from 20 to 99 diffuse reflection at a wavelength from 200 nm to 25000 nm. A plurality of ports is disposed on integrating hemisphere 24 mounting components of differential goniophotometer 100, e.g., fisheye lens 10, camera 54, photodetector 28, primary light source 12, auxiliary light source 20, and the like. A size (e.g., a largest linear dimension such as an inner diameter) of integrating hemisphere 2 can be from 1 centimeter (cm) to 200 meters (m), specifically from 1 cm to 10 m, and more specifically from 1 cm to 2 m.

Differential goniophotometer 100 can include primary light source 12 to produce primary light 14. Primary light source 12 can be a standard light source used for calibration of differential goniophotometer 100 or a test light source to be measured for determination of its optical properties such as luminance. Additionally, primary light source 12 can be a light source of any type, e.g., an incandescent lamp, a tungsten halogen lamp, a fluorescent lamp, an LED lamp, and like. Here, primary light 14 can be ultraviolet light, visible light, infrared light, and the like that can include a broadband continuous spectra or narrowband spectral line.

Differential goniophotometer 100 can include auxiliary light source 20 to produce auxiliary light 22. Auxiliary light source 20 is used to measure the amount of light absorbed by the primary light source 12 (also referred to as self-absorption) or any components inside the integrating sphere. Additionally, auxiliary light source 20 is a light source that is stable over a short period of time for measurement of the absorbed light. Auxiliary light 22 can be similar to primary light or can have a broader spectral range than the spectral response range of the photodetector 28.

Differential goniophotometer 100 can include photodetector 28 to receive primary light 14, auxiliary light 22, and the like. Photodetector 28 can include a photodiode, radiometer, and spectroradiometer, and the like. Moreover, photodetector 28 is used to measure total luminous flux, total radiant flux, or total spectral radiant flux and optional self-absorption of the primary light source 12.

Figure 17:
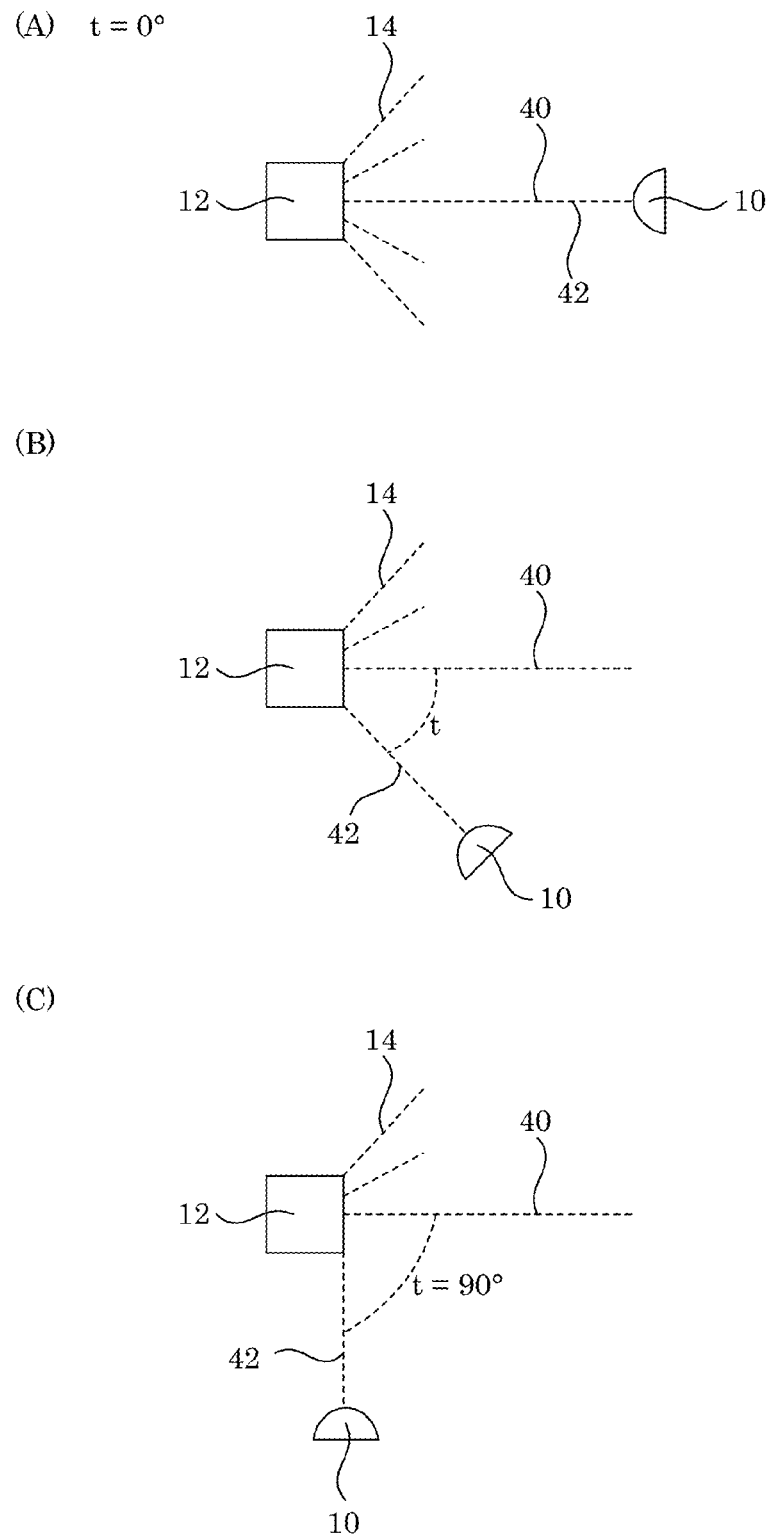
FIG. 17 shows a primary light source and fisheye lens of a differential goniophotometer.

With reference to FIG. 17, in differential goniophotometer 100, angle t (shown in panel B) between optical axis 40 of primary light source 12 and lens axis 42 of fisheye lens 10 can be from 0° (e.g., as shown in panel A) to 180°. In an embodiment, angle t is 90°.

In an embodiment, a process for making differential goniophotometer 100 includes providing integrating member 2 that includes interior 6 bounded by interior wall 4; disposing fisheye lens 10 in interior 6; and disposing primary light source 12 in interior 6. The process further can include disposing photometer 28 on integrating member 2; disposing auxiliary light 20 on integrating sphere 2 such that light baffle 24 receives auxiliary light 22 produced by axillary light source 20.

Differential goniophotometer 100 has numerous beneficial uses, including acquiring optical data of primary light 14 from primary light source 12. The optical data of primary light 14 can include angular luminous intensity distribution, angular radiant intensity distribution, and the like. In an embodiment, a process for acquiring optical data of primary light 14 includes providing differential goniophotometer 100; producing primary light 14 from primary light source 12; receiving primary light 14 by fisheye lens 10; communicating primary light 14 from fisheye lens 10 to camera 54 to acquire optical data of primary light 14. Optical data of primary light 14 can include a curvilinear image of primary light 14 that is subjected to data analysis, e.g., deconvolution, to obtain an angular distribution of an intensity of primary light 14 produced by primary light source 12.

Differential goniophotometer 100 and articles thereof have numerous advantageous and beneficial properties. Differential goniophotometer 100 can measure angular intensity distribution of a primary light source 12 over entire $4\pi$ steradian in less than one second instead of hours when a conventional mechanical scanning goniophotometer, gonioradiometer, or gonio-spectroradiometer is used. Moreover, differential goniophotometer 100 also measures total luminous flux, total radiant flux, or total spectral radiant flux at the same time with a much higher accuracy compared to those measured by a conventional integrating sphere measurement system. The high accuracy measurement by differential goniophotometer 100 is achieved by correcting or eliminating measurement error resulting from non-uniformity of the integrating sphere 2 using the measured angular intensity distribution of the primary light source 12 and non-uniformity of the integrating sphere 2. Such a non-uniformity error can be a dominant measurement error and can be a fundamental or practical limit of achievable accuracy of a conventional integrating sphere measurement system.

Advantageously and unexpectedly, differential goniophotometer 100 provides luminous intensity distribution of primary light source 12. Furthermore, differential goniophotometer 100 provides an overall measurement uncertainty that can be determined regardless of a spatial non-uniformity of interior wall 4 of integrating sphere 2. Moreover, differential goniophotometer 100 provides determination of total luminous or radiant flux and intensity distribution of primary light source 12 at simultaneously.

The articles and processes herein are illustrated further by the following Example, which is non-limiting.

EXAMPLE

Differential photogoniometric determination of spatial distribution of primary light from a primary light source.

A differential goniophotometer was constructed similar to the configuration shown in FIG. 8. Here, a camera with a fisheye lens (collectively referred to as "fisheye camera") provided a wide field of view was disposed on a port of an integrating sphere for measuring relative luminance or radiance distribution over an entire $4\pi$ sphere surface. A photodetector was disposed on the integrating sphere to measure total luminous flux of the primary light source. The fisheye camera had a field of view of 180°, wherein the fisheye lens observed every part of the interior wall of the integrating sphere. To improve a measurement uncertainty of luminance at a large viewing angle, the 180° fisheye camera can be replaced by two 90° fisheye cameras, each of which covering a half-sphere surface.

Similarly, a fisheye camera can also be added to an integrating sphere or an integrating hemisphere (instead of an integrating sphere) with a $2\pi$ measurement geometry, where both the primary light source and the camera are mounted on different ports of the integrating sphere or (in the case of a hemisphere) at the center of the hemisphere.

In this configuration, the differential goniophotometer functions as an imaging instrument. In the differential goniophotometer, the integrating sphere is an extra-optic that converts a two-dimensional (2D) angular luminous intensity distribution of a light source to a 2D linear luminance distribution for the camera by the fisheye lens. As an imaging instrument, the differential goniophotometer provides an imaging property that can be characterised by a point spread function (PSF), which describes a relative response of the fisheye lens to a point source. A PSF of the differential goniophotometer can be obtained by measuring a small spot light source mounted at the centre of the sphere as the primary light source, which illuminates directly only a small part of the sphere surface. By scanning the spot light source, all PSFs of the sphere-camera system can be measured. The PSF with an integrating sphere also can be calculated following integrating theory. Assuming the entire interior wall of the integrating sphere is evenly divided into a total number of surface elements (n) arranged mathematically in a 1-dimensional array and indexed by 1, 2, . . . , i, . . . , or n, the luminance on the interior wall of the integrating sphere when the spot primary light source illuminates primary light directly on element, J, is provided by formula (1) and formula (2).

$$L_J = \frac{\Phi_J \rho_J n}{4\pi^2 r^2} + \frac{\Phi_J \rho_J^2 \rho}{4\pi^2 r^2 (1-\rho)} \tag{1}$$

$$L_i = \frac{\Phi_J \rho_J \rho_i}{4\pi^2 r^2 (1-\rho)} \tag{2}$$

wherein $L_J$ is the luminance at selected j-th element J; $L_i$ is the luminance at any other element, i; $\Phi_J$ is the total luminous flux from the spot light illuminating the element, J, directly; $\rho_j$ is the diffuse reflectance of coating at element, J; $\rho_i$ is the diffuse reflectance of coating at element, i; $\rho$ is the effective diffuse reflectance of the sphere determined by the averaged coating reflectance, total port areas, self-absorption of the light source; r is the radius of the sphere; n is the total number of surface elements.

The PSF array of the integrating sphere, $o_{i,j}$, (the ratio of $L_i$ to $L_J$) corresponding to element, J, is provided by formula (3).

$$o_{i,J} = \begin{cases} 1 & i = J \\ \frac{\rho_i}{(1-\rho)n + \rho_J \rho} & i = 1, 2, \ldots, J-1, J+1, \ldots n \end{cases} \tag{3}$$

Figure 18:
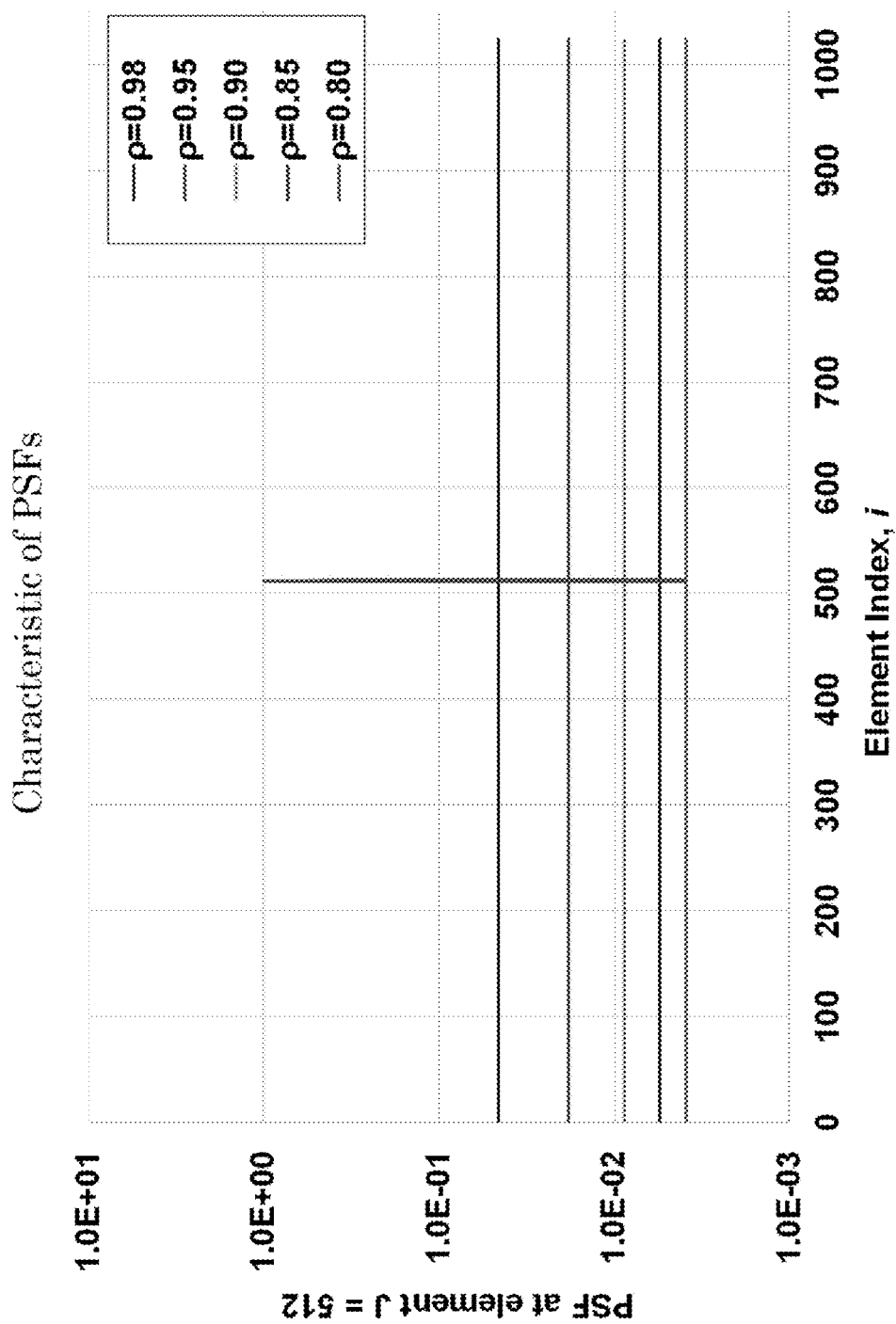
FIG. 18 shows a graph of point spread function (PSF) versus element index.

FIG. 18 shows five calculated PSFs of an integrating sphere with an effective reflectance of the interior wall of the integrating sphere from 0.80 to 0.98 and a total number of surface elements n=1024. The PSF depends on the effective reflectance (p). Also, values of a PSF are constant (for an ideal sphere) and orders of magnitude higher than those of a typical imaging camera (imaging instrument) due to multiple reflections of light inside the integrating sphere. Therefore, for a sphere-camera system the PSF of the camera has a much smaller effect compared to the PSF of the integrating sphere. Also, the resolution of a typical camera is orders of magnitude higher compared to size of a surface element of the sphere (e.g., millions of camera's pixels versus thousands of sphere's surface elements).

Figure 19:
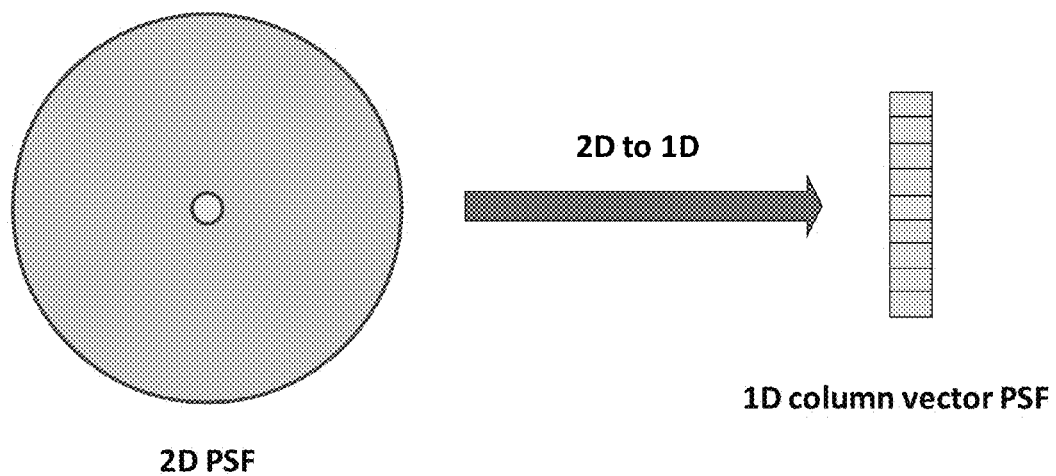
FIG. 19 shows a conversion from a two-dimensional (2-D) PSF to a one-dimensional (1-D) PSF.
Figure 21:
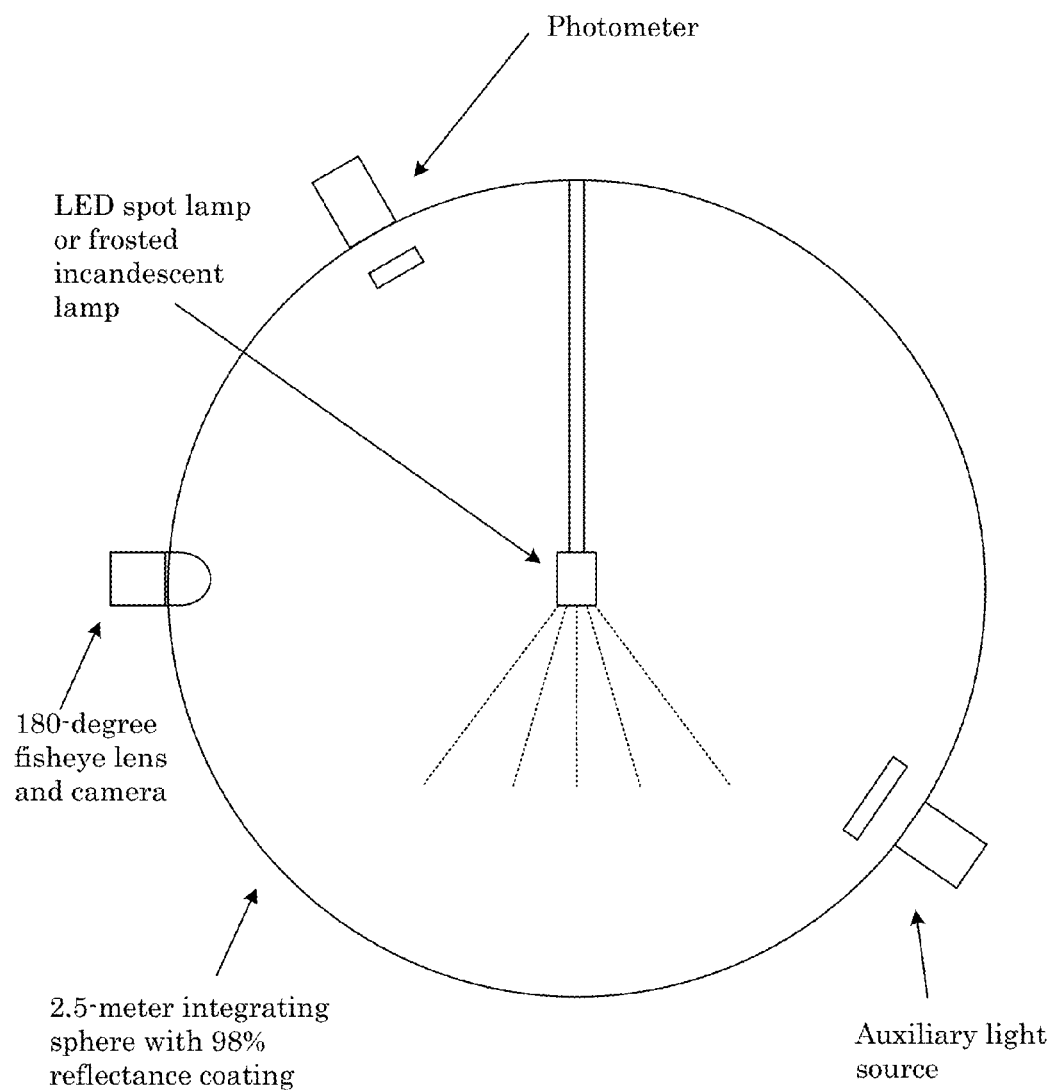
FIG. 21 shows a differential goniophotometer according to the Example.
Figure 22:
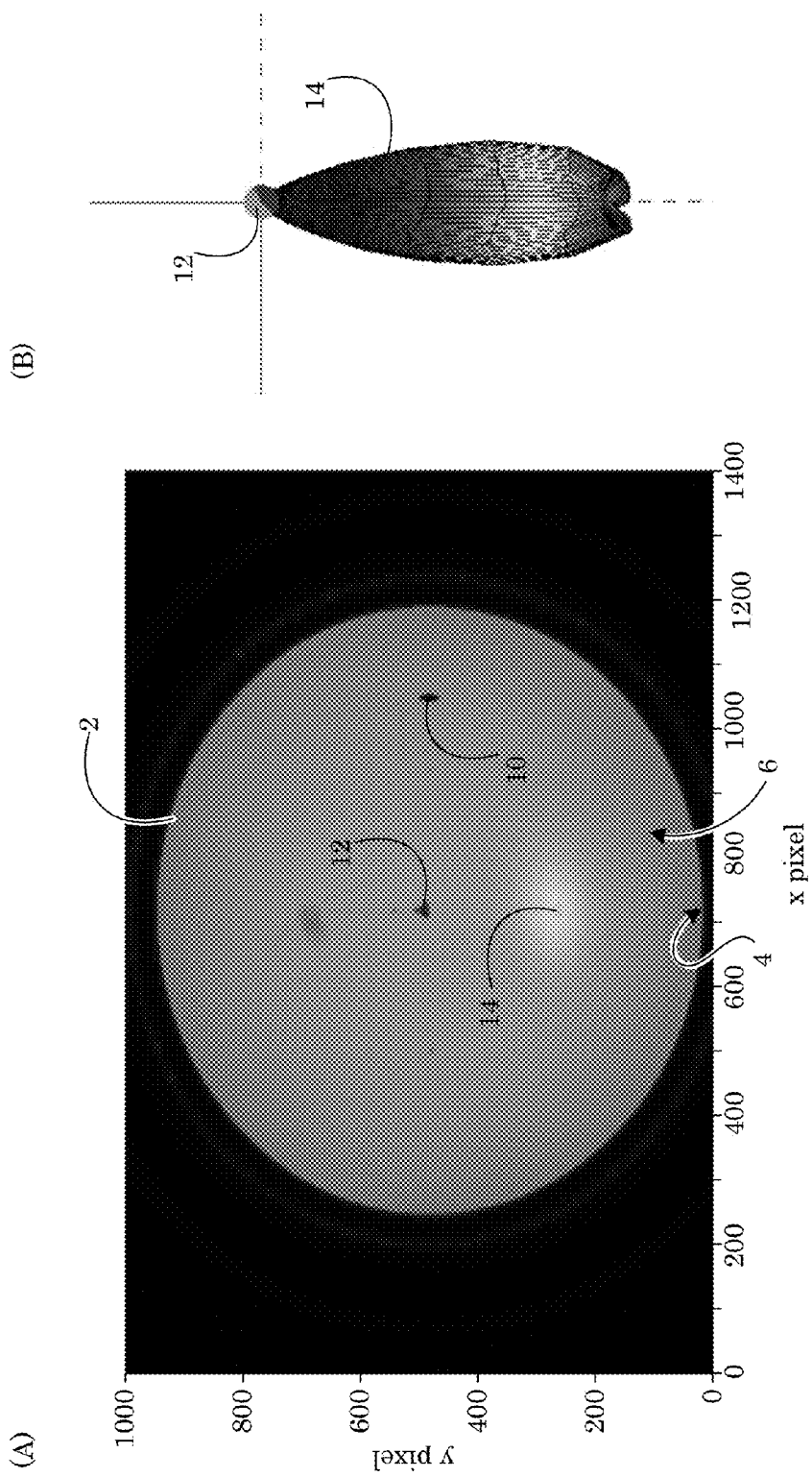
FIG. 22 shows a curvilinear image of an interior of an integrating sphere and a primary light source of a differential goniophotometer in panel A, and panel B shows an angular distribution of primary light produced by the primary light source.

By obtaining every PSF array corresponding to each surface element and transforming it to a column vector as shown in FIG. 19, a n×n PSD matrix H as shown in FIG. 20 can be constructed, wherein each column of which is filled by a corresponding column vector PSF.

The luminance on a surface element is contributed by two components of light. One component is the luminous flux of the light source within the solid angle covered by the area of the element. The other component is the rest of the luminous flux of the light source. The total luminance, $L_{I,\,meas}$, measured at any element, I, is provided by formula (4).

$$L_{I,meas} = \sum_{j=1}^{n} h_{I,j} \times L_j \tag{4}$$

wherein $h_{I,j}$ is element, j, at row, I, of the PSF matrix; and $L_j$ is the luminance at element, j, resulting from the luminous flux of the light source within the solid angle covered by the area of the element, j.

The measured luminance for all elements can be expressed in the following matrix form provided by formula (5).

$$L_{meas} = HL \tag{5}$$

wherein $L_{meas}$ is the column vector of the measured luminance; and L is the column vector of luminance resulting from the luminous flux of the light source within the solid angle covered by the area of corresponding element.

Luminance L can be obtained by directly solving formula (5). It also can be obtained by a matrix inversion provided by formula (6).

$$L = H^{-1} L_{meas} \tag{6}$$

wherein $H^{-1}$ is the inverse of the PSF matrix, H.

Relative angular luminous intensity distribution of the light source is provided by formula (7).

$$I_{v,rel} = \pi r^2 (\rho L) \tag{7}$$

wherein $I_{v,rel}$ is the column vector of the relative angular luminous intensity distribution; and p is the 1-dimensional array of coating reflectance of the surface elements.

The obtained relative angular luminous intensity distribution $I_{v,rel}$ provides a correction for the angular mismatch error of the integrating sphere measurement of the test primary light source resulting from non-uniformity in the integrating sphere as provided in formula (8).

$$C_\tau = \frac{\sum_{i=1}^{n} I_{v,rel,i(test)}}{\sum_{i=1}^{n} I_{v,rel,i(test)} \rho_i} \bigg/ \frac{\sum_{i=1}^{n} I_{v,rel,i(standard)}}{\sum_{i=1}^{n} I_{v,rel,i(standard)} \rho_i} \tag{8}$$

wherein $C_\tau$, is the angular mismatch correction factor; $I_{v,rel,i\,(test)}$ is the relative luminous intensity of the test light source at the direction corresponding to the surface element, i; and $I_{v,rel,i\,(standard)}$ is the relative luminous intensity of standard light source at the direction corresponding to the surface element, i.

Absolute angular luminous intensity distribution of the light source is provided by formula (9).

$$I_v = k I_{v,rel} \tag{9}$$

wherein $I_v$ is the column vector of the absolute angular luminous intensity distribution; k is the scaling factor provided by formula (10)

$$k = \frac{\Phi_V n}{4\pi \sum_{i=1}^{n} I_{v,rel,i}} \tag{10}$$

wherein $\Phi_v$ is the total luminous flux of the light source; and $I_{v,rel,i}$ is the relative luminous intensity of the light source at the direction corresponding to the surface element, i.

An experiment was performed to measure the curvilinear image of luminance distribution inside the integrating sphere of the differential goniophotometer. A 16 bit, 180-degree fisheye black and white digital camera was mounted on a sphere port of a 2.5-m integrating sphere to measure luminance distribution inside the integrating sphere for an LED spot lamp as shown in FIG. 19.

The measured luminance distribution over the entire 4π sphere surface is shown in panel A of FIG. 20. The bright white spot near the bottom of the integrating sphere is the first-hit area of the primary light from the primary light source (here, the spot lamp beam), and the relative angular luminous intensity distribution obtained using Equation 7 is shown in panel B of FIG. 20. The integrating sphere had a coating reflectance of 0.98.

The differential goniophotometer can be implemented into an integrating system for simultaneous fast measurements of total flux and luminous or radiant intensity distributions of primary light sources. The measured intensity distribution of the primary light source provides correction of the measurement error associated with integrated sphere non-uniformity, which can lead to a significant reduction of the overall measurement uncertainty.

The experimental result demonstrated that the luminance or radiance distributions of light sources can be measured inside the integrating sphere even with high coating reflectance of 98%. Measurement of a luminance or radiance distribution inside the integrating sphere of the differential goniophotometer with a lower coating reflectance (e.g., 90%) is much easier because the difference of luminance or radiance inside the integrating sphere is much larger. Also, an integrating sphere with a low coating reflectance is more stable and less susceptible to self-absorption error.

In some experiments, the differential goniophotometer includes a temperature-controlled scanning LED spot source for measurement of the spatial non-uniformity of the integrating sphere, point spread functions, and relative calibration of the camera.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A differential goniophotometer comprising:
    an integrating member comprising an interior bounded by an interior wall and that receives, in the interior, a primary light source that provides primary light;
    a fisheye lens disposed in the interior of the integrating member in optical communication with the primary light source such that the fisheye lens:
        receives the primary light from the primary light source, and
        provides a curvilinear image of the interior of the integrating member and the primary light; and
    the primary light source,
    wherein the primary light source is disposed in a center of the integrating member.

2. The differential goniophotometer of claim 1, wherein:
    the fisheye lens is disposed on the interior wall of the integrating member.

3. The differential goniophotometer of claim 1, wherein:
    the fisheye lens is interposed between the center of the integrating member and the interior wall.

4. A differential goniophotometer comprising:
    an integrating member comprising an interior bounded by an interior wall and that receives, in the interior, a primary light source that provides primary light;
    a fisheye lens disposed in the interior of the integrating member in optical communication with the primary light source such that the fisheye lens:
    receives the primary light from the primary light source, and
    provides a curvilinear image of the interior of the integrating member and the primary light; and
    the primary light source,
    wherein the primary light source is interposed between a center of the integrating member and the interior wall.

5. The differential goniophotometer of claim 4, wherein:
    the fisheye lens is disposed on the interior wall of the integrating member.

6. The differential goniophotometer of claim 4, wherein:
    the fisheye lens is interposed between the center of the integrating member and the interior wall.

7. The differential goniophotometer of claim 4, wherein:
    the fisheye lens is disposed at the center of the integrating member.

8. The differential goniophotometer of claim 1, further comprising:
    an auxiliary light source disposed in the interior of the integrating member such that the auxiliary light source produces auxiliary light and comprises:
        a luminous surface to communicate the auxiliary light; and
        a light baffle interposed between the luminous surface and the fisheye lens.

9. The differential goniophotometer of claim 1, further comprising:
    a photometer comprising:
        a photodetector disposed on the integrating member; and
        a light baffle disposed in a view of the photodetector.

10. The differential goniophotometer of claim 1, wherein the fisheye lens comprises a field of view from 180° to 360°.

11. The differential goniophotometer of claim 1, wherein the field of view of the fisheye lens subtends $4\pi$ steradians.

12. The differential goniophotometer of claim 1, wherein the fisheye lens comprises a field of view from 90° to 180°.

13. The differential goniophotometer of claim 1, further comprising a camera in optical communication with the fisheye lens to receive the curvilinear image of the interior of the integrating member and the primary light from the fisheye lens.

14. The differential goniophotometer of claim 1, wherein the integrating member comprises an integrating sphere.

15. The differential goniophotometer of claim 1, wherein the integrating member comprises an integrating hemisphere.

16. A differential goniophotometer comprising:
   an integrating member comprising an interior bounded by an interior wall;
   a primary light source disposed in the interior of the integrating member and that provides primary light to the interior;
   a fisheye lens disposed in the interior of the integrating member in optical communication with the primary light source such that the fisheye lens:
      receives the primary light from the primary light source, and
      provides a curvilinear image of the interior of the integrating member and the primary light;
   an auxiliary light source disposed in the interior of the integrating member such that the auxiliary light source produces auxiliary light and comprises:
      a luminous surface to communicate the auxiliary light; and
      a light baffle interposed between the luminous surface and the fisheye lens; and
   a photometer comprising:
      a photodetector disposed on integrating member; and
      a light baffle disposed in a view of the photodetector.

17. The differential goniophotometer of claim 16, wherein the integrating member comprises an integrating sphere.

18. The differential goniophotometer of claim 16, wherein the integrating member comprises an integrating hemisphere.

* * * * *